US012437231B2

(12) United States Patent
Grady et al.

(10) Patent No.: US 12,437,231 B2
(45) Date of Patent: Oct. 7, 2025

(54) DIFFERENTIAL MULTI MODEL TRAINING FOR MULTIPLE INTERPRETATION OPTIONS

(71) Applicant: Schlumberger Technology Corporation, Sugar Land, TX (US)

(72) Inventors: Francis Grady, Stavanger (NO); Mats Stivang Ramfjord, Asker (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 837 days.

(21) Appl. No.: 17/310,449

(22) PCT Filed: Feb. 5, 2020

(86) PCT No.: PCT/US2020/016745
§ 371 (c)(1),
(2) Date: Aug. 4, 2021

(87) PCT Pub. No.: WO2020/163447
PCT Pub. Date: Aug. 13, 2020

(65) Prior Publication Data
US 2022/0121987 A1 Apr. 21, 2022

Related U.S. Application Data

(60) Provisional application No. 62/801,584, filed on Feb. 5, 2019.

(51) Int. Cl.
*G06N 20/00* (2019.01)
*G01V 1/28* (2006.01)

(52) U.S. Cl.
CPC ............. *G06N 20/00* (2019.01); *G01V 1/282* (2013.01)

(58) Field of Classification Search
CPC ............................... G06N 20/00; G01V 1/282
USPC ............................................................ 706/12
See application file for complete search history.

(56) References Cited

U.S. PATENT DOCUMENTS

| | | | |
|---|---|---|---|
| 9,934,338 B2* | 4/2018 | Germain | E21B 7/00 |
| 2013/0080066 A1 | 3/2013 | Al-Dossary et al. | |
| 2013/0159314 A1* | 6/2013 | Kao | G06F 16/9562 |
| | | | 707/740 |

(Continued)

OTHER PUBLICATIONS

Gong et al, 2017, "Learning with Inadequate and Incorrect Supervision" (Year: 2017).*

(Continued)

*Primary Examiner* — Abdullah Al Kawsar
*Assistant Examiner* — Jun Kwon
(74) *Attorney, Agent, or Firm* — Jeffrey D. Frantz

(57) ABSTRACT

Computing systems, computer-readable media, and methods for providing multiple computer-generated seismic data interpretation options, of which the method includes receiving a training input, sorting the training input into a first group and a second group, subgrouping the second group into a plurality of subgroups, generating a plurality of trained models based on the plurality of subgroups and the first group, receiving a prediction input having a set of data to be interpreted, generating a plurality of interpretation options for the prediction input by applying the plurality of training models to the prediction input, and outputting the plurality of interpretation options.

18 Claims, 13 Drawing Sheets

(56) References Cited

U.S. PATENT DOCUMENTS

| | | | |
|---|---|---|---|
| 2014/0225890 A1* | 8/2014 | Ronot | G06T 17/05 |
| | | | 354/420 |
| 2016/0313463 A1* | 10/2016 | Wahrmund | G01V 1/30 |
| 2016/0364654 A1 | 12/2016 | Gevirtz | |
| 2017/0254910 A1 | 9/2017 | Can et al. | |
| 2018/0004865 A1 | 1/2018 | Borrel et al. | |
| 2018/0106917 A1* | 4/2018 | Osypov | G01V 1/003 |
| 2020/0124753 A1* | 4/2020 | Halsey | G06F 30/20 |
| 2021/0174225 A1* | 6/2021 | Mino | G06N 20/00 |

OTHER PUBLICATIONS

Ansari et al, 2009, "Clustering analysis of the seismic catalog of Iran" (Year: 2009).*

Communication Pursuant to Article 94(3) issued in European Patent Application No. 20752601.3 dated Sep. 21, 2023, 6 pages.

International Preliminary Report on Patentability of International Patent Application No. PCT/US2020/016745 mailed Aug. 19, 2021, 9 pages.

International Search Report and Written Opinion of International Patent Application No. PCT/US2020/016745, mailed Jun. 5, 2020, 10 pages.

Xiao, H. et al., "Ensemble classification based on supervised clustering for credit scoring", Applied Soft Computing, 2016, 43, pp. 73-86.

Abedini, M. et al., "Accurate and Scalable System for Automatic Detection of Malignant Melanoma", in Dermoscopy Image Analysis, 2015, 53 pages.

Sagi, O. et al., "Ensemble learning: A survey", Wiley Interdisciplinary Reviews: Data Mining and Knowledge Discovery, 2018, 8(4), 18 pages.

Extended Search Report issued in European Patent Application 20752601.3 dated Sep. 9, 2022, 9 pages.

* cited by examiner

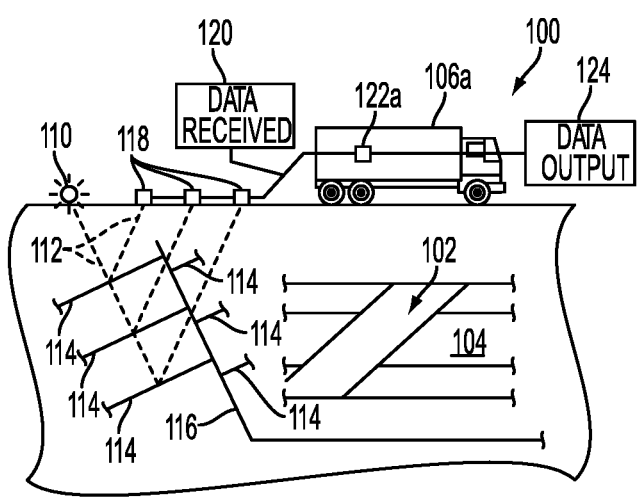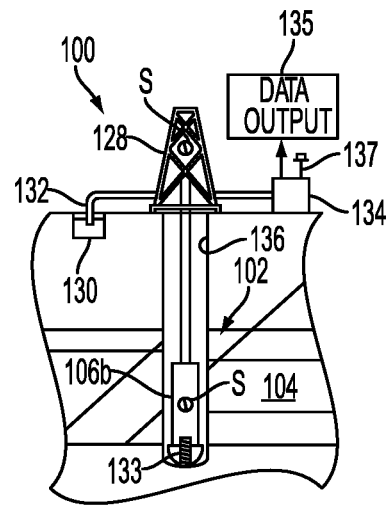
FIG. 1A  FIG. 1B
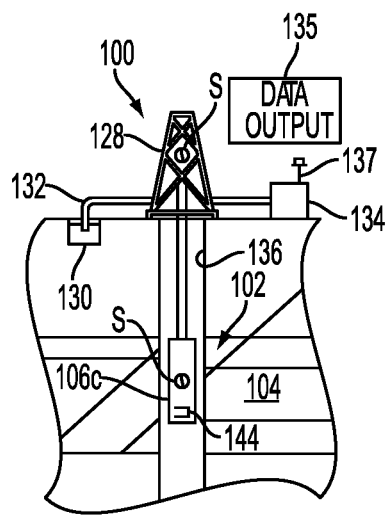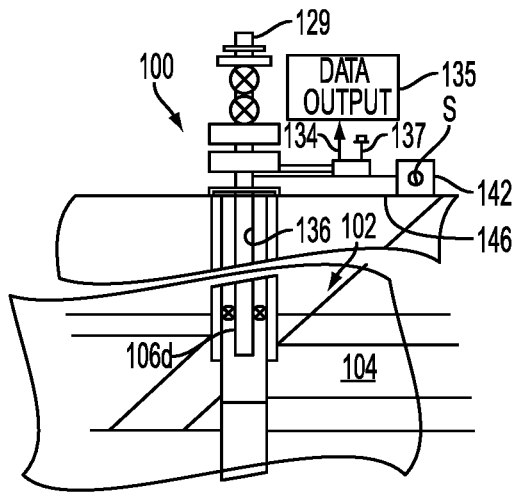
FIG. 1C  FIG. 1D

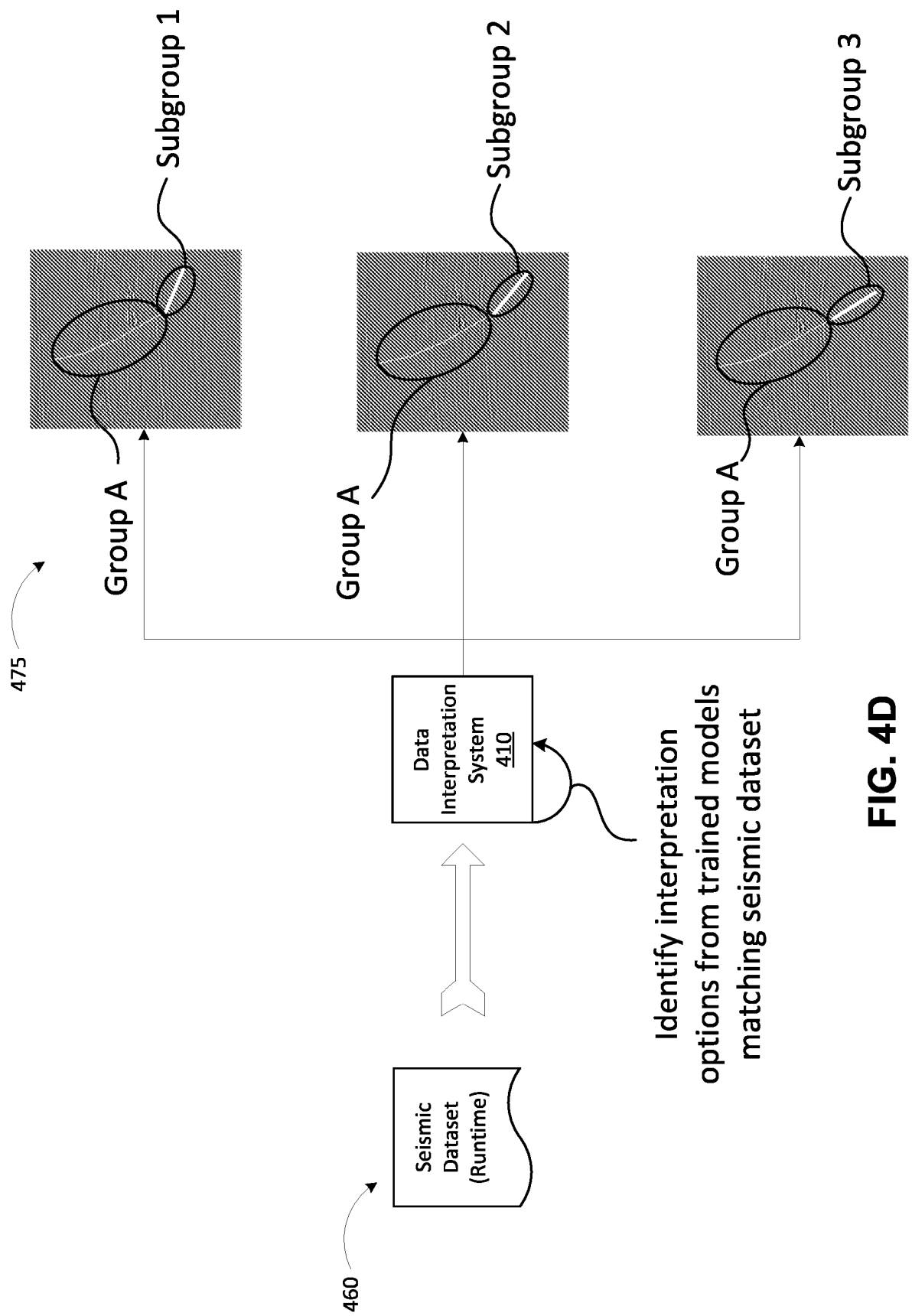

DIFFERENTIAL MULTI MODEL TRAINING FOR MULTIPLE INTERPRETATION OPTIONS

CROSS-REFERENCE TO RELATED APPLICATIONS

This application is a National Stage Entry of International Application No. PCT/US2020/016745, filed on Feb. 5, 2020, which claims priority to U.S. Provisional Patent Application Ser. No. 62/801,584, which was filed on Feb. 5, 2019. The entirety of this provisional application is incorporated herein by reference.

BACKGROUND

Seismic interpretation involves inferring the geology at some depth from a processed seismic record. A seismic record may contain two basic elements for the interpreter to study. One element may include the time of arrival of any reflection (or refraction) from a geological surface. The actual depth to this surface is a function of the thickness and velocity of overlying rock layers. A second element is the shape of the reflection, which includes how strong the signal is, what frequencies it contains, and how the frequencies are distributed over the pulse. This information can often be used to support conclusions about the lithology and fluid content of the seismic reflector being evaluated. Observations made using seismic data can be mapped on a base map, or presented in any variety of manner. Seismic interpretations may be used for a variety of purposes, such as oil/gas exploration planning, drilling operations planning, etc.

While modern multichannel data have increased the quantity and quality of interpretable data, interpretation generally calls for the interpreter to draw upon his or her geological understanding to pick an interpretation from the many nominally "valid" interpretations that the data allow. As such, seismic interpretation involves substantial manual effort and human educated guess work based on acquired experience. That is, two different human interpreters are unlikely to independently produce identical interpretations. In some situations, the differences in interpretations may be trivial, but in other situations, the differences may result in the use of different guidance methods or out-of-preference or experience. Interpretation differences may be more likely to occur in cases where there is little data to confirm one interpretation or another.

SUMMARY

Embodiments of the present disclosure may provide a method including receiving a training input; sorting the training input into a first group and a second group, subgrouping the second group into a plurality of subgroups, generating a plurality of trained models based on the plurality of subgroups and the first group; receiving a prediction input having a set of data to be interpreted, generating a plurality of interpretation options for the prediction input by applying the plurality of training models to the prediction input; and outputting the plurality of interpretation options In an embodiment, the training input includes interpretations of seismic data. The first group may include a portion of the training inputs in which the interpretations match and the second group comprises a portion of the training data in which the interpretations do not match. In an embodiment; individual subgroups of the plurality of subgroups are associated with interpretation attributes. In an embodiment, the prediction input may include target seismic data to be interpreted. In an embodiment, the trained models may further be generated based on a supervised machine learning technique. In an embodiment, the method may further include scoring the plurality of interpretation options and sorting the plurality of interpretation options based on the scoring.

Embodiments of the present disclosure may also provide a computing system having one or more processors, and a memory system including one or more non-transitory computer-readable media storing instructions that, when executed by at least one of the one or more processors, cause the computing system to perform operations. The operations include receiving a training input, sorting the training input into a first group and a second group, subgrouping the second group into a plurality of subgroups, generating a plurality of trained models based on the plurality of subgroups and the first group, receiving a prediction input having a set of data to be interpreted, generating a plurality of interpretation options for the prediction input by applying the plurality of training models to the prediction input, and outputting the plurality of interpretation options.

Embodiments of the present disclosure may also provide a non-transitory computer-readable medium storing instructions that, when executed by one or more processors of a computing system, cause the computing system to perform operations. The operations include receiving a training input, sorting the training input into a first group and a second group, subgrouping the second group into a plurality of subgroups, generating a plurality of trained models based on the plurality of subgroups and the first group, receiving a prediction input having a set of data to be interpreted, generating a plurality of interpretation options for the prediction input by applying the plurality of training models to the prediction input, and outputting the plurality of interpretation options Embodiments of the present disclosure may further provide a computing system having means to receive a training input, means to sort the training input into a first group and a second group, means to subgroup the second group into a plurality of subgroups, means to generate a plurality of trained models based on the plurality of subgroups and the first group, means to receive a prediction input having a set of data to be interpreted, means to generate a plurality of interpretation options for the prediction input by applying the plurality of training models to the prediction input, and means to output the plurality of interpretation options Embodiments of the present disclosure may further provide a computing system configured to receive a training input, sort the training input into a first group and a second group, subgroup the second group into a plurality of subgroups, generate a plurality of trained models based on the plurality of subgroups and the first group, receive a prediction input having a set of data to be interpreted, generate a plurality of interpretation options for the prediction input by applying the plurality of training models to the prediction input, and output the plurality of interpretation options.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 4D illustrates an example of interpreting a target dataset using trained models, according to an embodiment.

DESCRIPTION OF EMBODIMENTS

Figure 2:
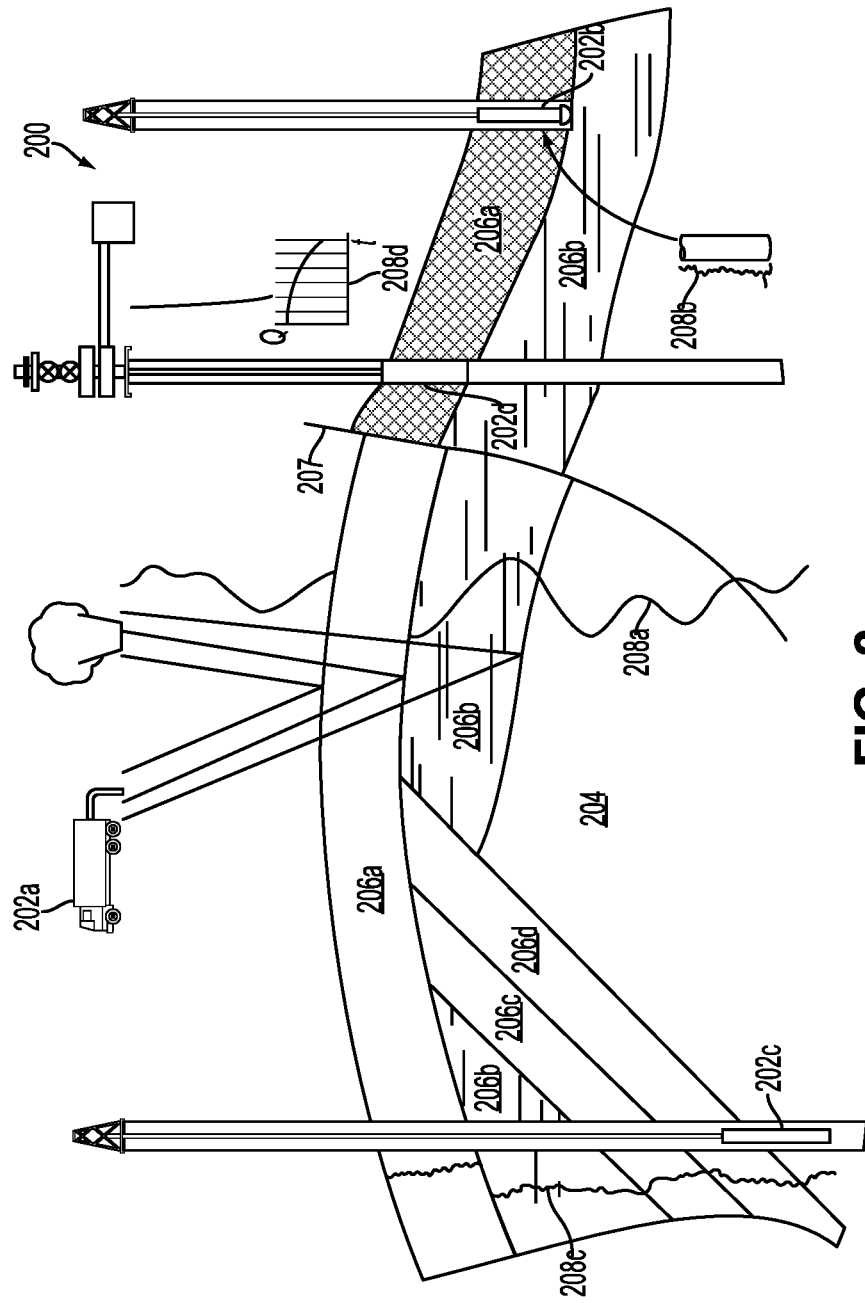

Embodiments of the present disclosure may include systems and/or methods that provide end users (e.g., seismic interpreters) with multiple interpretation options of seismic data. More specifically, machine learning techniques may be employed to produce different interpretation options in which each interpretation option is developed based on different machine learning models that have been generated with consideration to varying interpretation techniques, interpretation preferences, interpreter experiences, geological considerations, etc. In areas in which different seismic data interpretations may differ significantly, aspects of the present invention may provide multiple computer-generated, non-subjective, rules-based, interpretation options. A seismic data interpreter may then independently analyze each interpretation option, and determine mitigating decisions based on a selected interpretation option. In this way, more effective and intelligent options may be made as a result of the seismic interpreter having more options at their disposal.

In some implementations, aspects of the present invention may receive, as input, seismic cubes and subject matter expert's (SME's) seismic interpretations (such as fault sticks, horizon interpretations, salt body boundaries, geobodies, etc.) on those cubes. Aspects of the present disclosure may train a set of machine learning algorithms on the input training data. In some implementations, the set of machine learning algorithms may be used to produce predictions on input seismic data.

As further described herein, aspects of the present disclosure may receive seismic training input datasets in which each dataset includes a training seismic dataset (e.g., an image) and multiple different interpretations of that dataset (e.g., interpretations by set of seismic interpreters). The training input datasets may be sorted and separated into first and second groups in which the first group includes portions of the training datasets in which the different interpretations are in agreement, and the second group includes portions of the training datasets in which the interpretations are in disagreement. The second group may be further divided into multiple subgroups in which each subgroup includes different attributes. For example, one subgroup may include interpretations made by interpreters who specialize in seismic data interpretations from a particular geographic region, whereas another subgroup may include interpretations made using a particular type of interpretation technique. Aspects of the present disclosure may further generate trained models based on the first group and each of the second subgroups. The trained models are then used (e.g., in runtime) to generate seismic interpretation options for an input seismic dataset. These seismic interpretation options may be presented to a user (e.g., a subject-matter expert or seismic interpreter) to provide the user with additional interpretation information to make more accurate seismic interpretations. The seismic interpretations may be used as a data point or factor in oil/gas exploration planning activities, drilling equipment procedures, drilling operations, etc.

In some embodiments, aspects of the present disclosure may produce trained models are using computer-based machine learning techniques. The processes described herein therefore transform a previously subjective process of interpreting data into a machine-based non-subjective process based on trained models.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122.1 of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c, and 202d positioned at various locations along oilfield 200 for collecting data of subterranean formation 204 in accordance with implementations of various technologies and techniques described herein. Data acquisition tools 202a-202d may be the same as data acquisition tools 106a-105d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208*d* is typically used by the reservoir engineer to determine fluid flow reservoir characteristics. The data analyzed by the geologist, geophysicist and the reservoir engineer may be analyzed using modeling techniques.

Figure 3A:
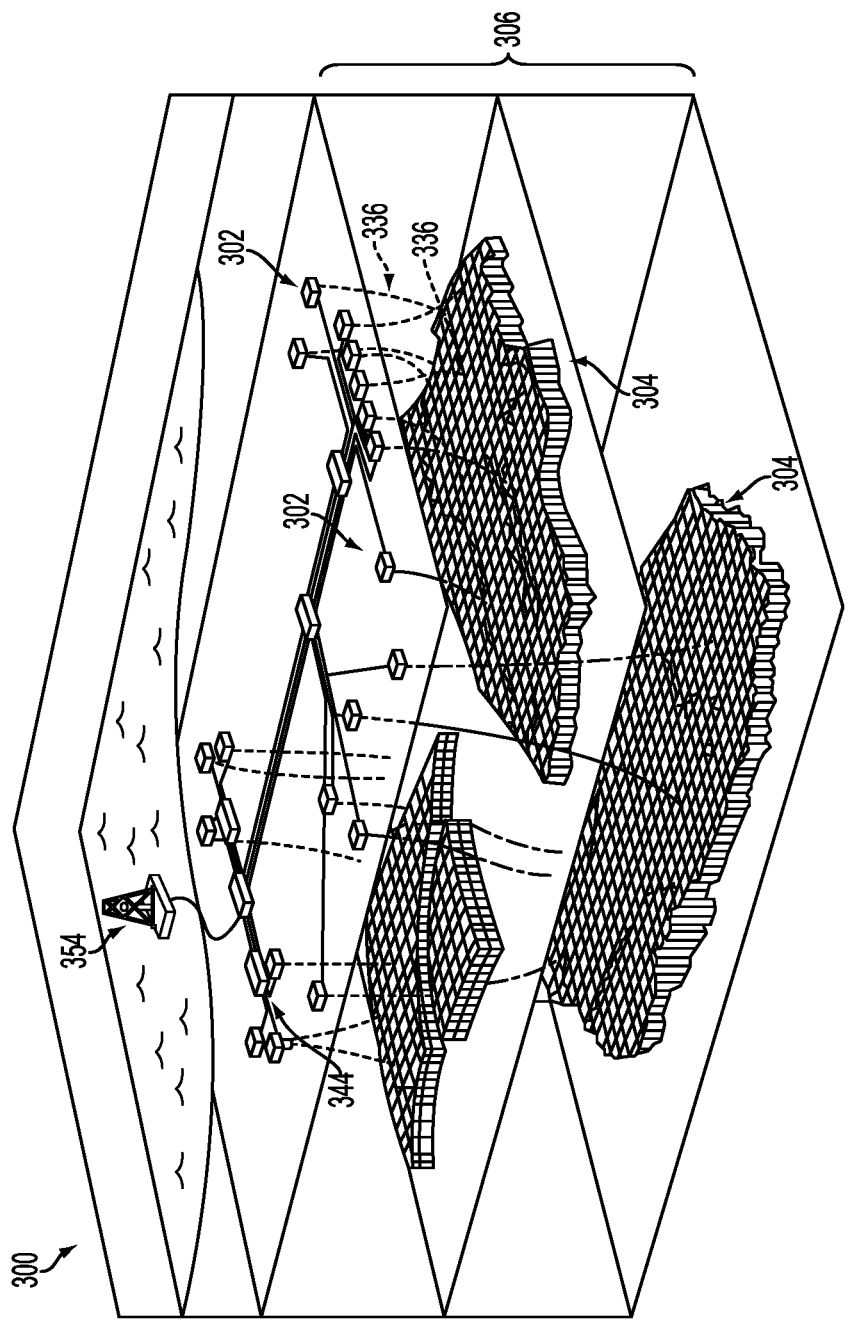

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
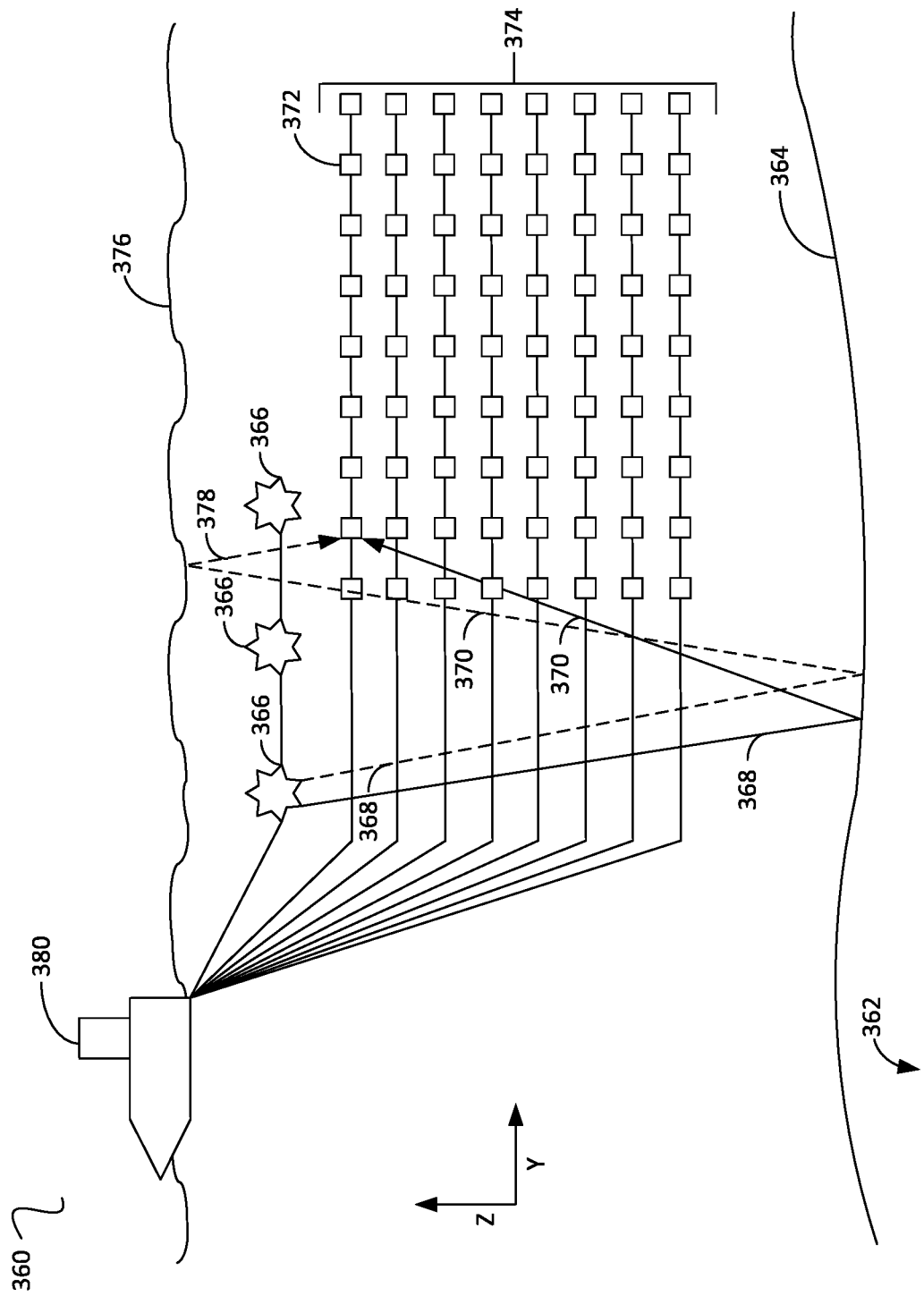

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4B:
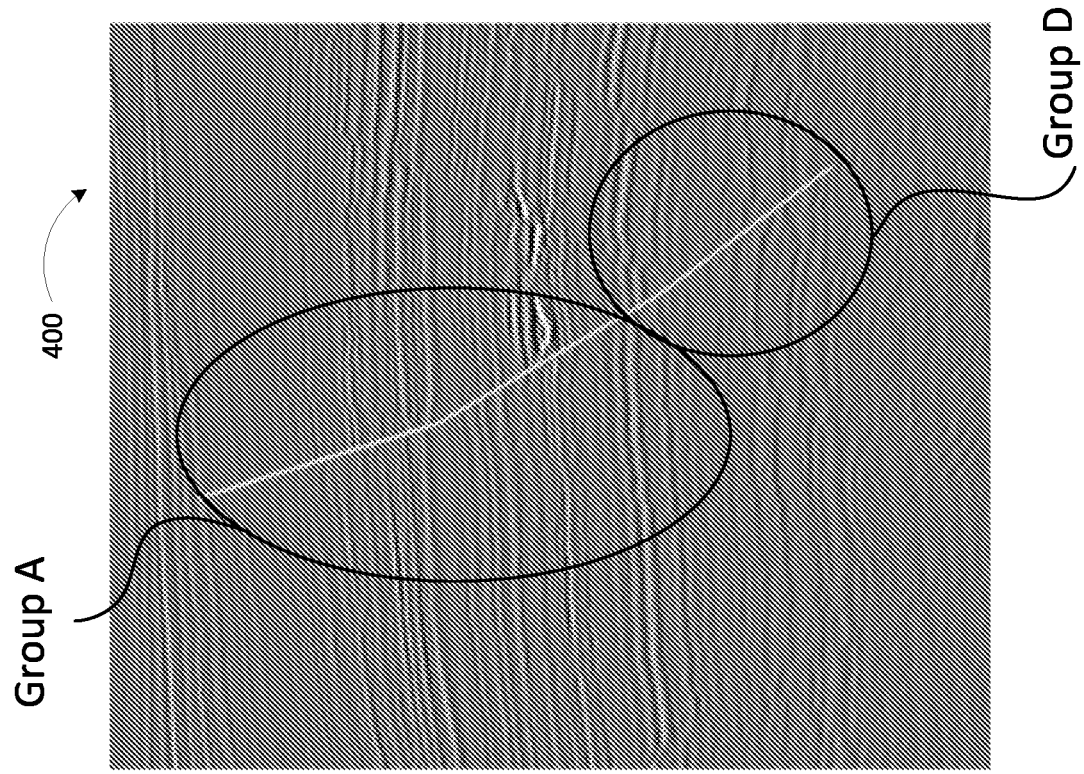
FIGS. 4A and 4B illustrate different example interpretations of seismic data, according to an embodiment.
Figure 4A:
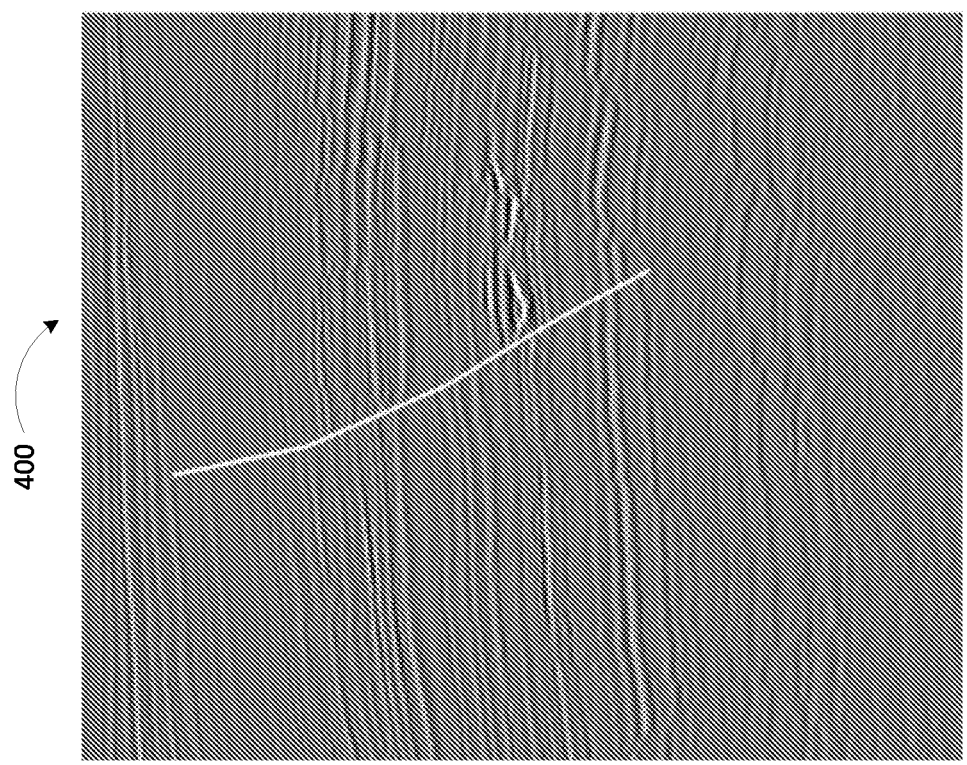

As described herein, multiple different seismic interpretations may be made from a common seismic dataset. Such a situation may occur when insufficient data exists to provide a definitive interpretation and/or in cases where interpreters base their interpretations on different interpretation techniques. FIGS. 4A, and 4B illustrate different example interpretations of a common seismic dataset. As shown in in FIGS. 4A and 4B, two interpretations may be made of the same geological/geophysical feature from the same set of seismic data 400. For example, fault each interpretation may include the presence of a fault line. In some situations, a portion of the two different interpretations may be common. For example, referring to FIG. 4B, the common portion of both interpretations (e.g., the portion in which both interpretations match or are in agreement) are indicated as group A. The portion where the interpretations do not match or are in disagreement or differ are indicated as group D. More specifically, group A indicates the portion of a fault line/fault stick that is present in both interpretations, and group D indicates the portion of the fault line that is not present in both interpretations. Other types of interpretations may also be analyzed for commonalities (e.g., horizon interpretations, salt body boundaries, geobodies, etc.).

Figure 4C:
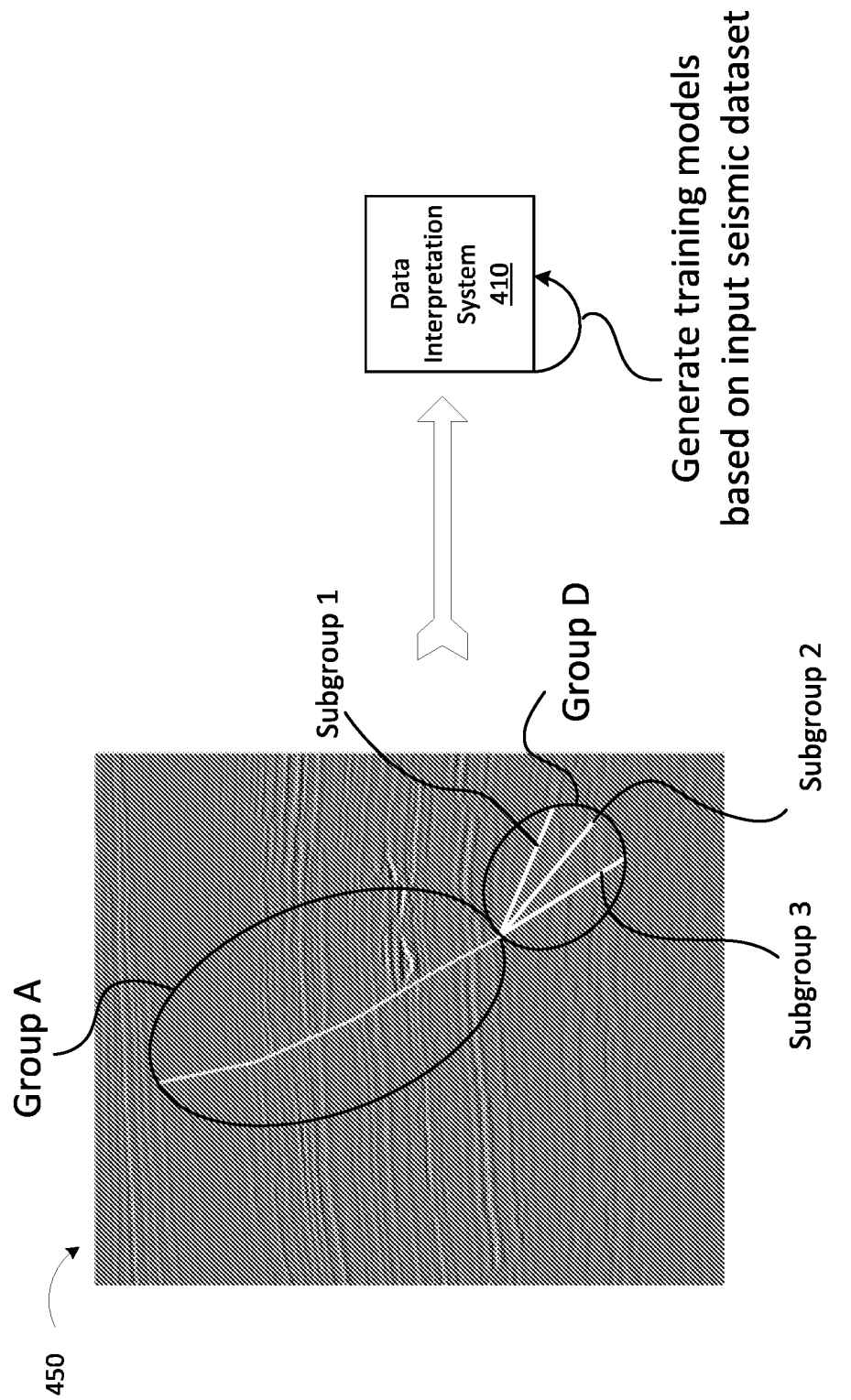
FIG. 4C illustrates an example of a training process performed by a data interpretation system, according to an embodiment.

As further described herein, trained models may be generated and used for interpreting seismic data. For example, the models may be trained using multiple known or predetermined interpretations of input training seismic datasets. FIG. 4C illustrates an example of a training process performed by a data interpretation system 410 in which training models are generated based on an input training seismic dataset 450 received by the data interpretation system 410. In the example of FIG. 4C, the input training seismic dataset 450 includes three different known or predetermined seismic interpretations (although it is noted that in practice, an input training seismic dataset may include any number of predetermined seismic interpretations). As described herein, the three different interpretations of the training seismic dataset 450 may be used as "ground truths" as part of generating trained models in which the trained models may be used to interpret a target seismic dataset (e.g., in run-time). That is, each interpretation may be considered a ground truth interpretation in which each ground truth is based on a manual, predetermined, or known (e.g., "true") interpretation of the training seismic dataset 450. As described herein, each interpretation may be associated with a set of attributes (e.g., interpretations by interpreters who specialize in interpretations from a particular geographic region, interpretations made using a particular type of interpretation technique, experience level of the interpreter, etc.). The portion in which the interpretations of three seismic datasets agree may be grouped (e.g., as group A), and the portion where the interpretations are in disagreement or differ may be grouped (e.g., as group D)

As further shown in FIG. 4C, group D may be further sub-divided (or "subgrouped") into three subgroups (e.g., one subgroup for each different interpretation, such as subgroups 1, 2, and 3). In this way, three ground truths may be established for a single training seismic dataset 450 in which each ground truth includes the portion in which the interpretations are in agreement (e.g., group A) and respective subgroups in which the interpretations are in disagreement (e.g., subgroups 1, 2, and 3). Each ground truth may be used to generate a trained model. Thus, in the example of FIG. 4C, three trained models may be generated in which the first model is based on a ground truth including group A and subgroup 1, the second model is based on a ground truth including group A and subgroup 2, and the third model is based on a ground truth including group A and subgroup 3. Each trained model may be used to generate an interpretation option for an input set of seismic data (e.g., a target or runtime seismic dataset for which the interpretation is unknown). As described herein, multiple training seismic datasets may be used to generate and store multiple sets of trained models. These trained models may then be used to generate interoperation options for an input target seismic dataset.

Referring to FIG. 4D, a seismic dataset 460 (e.g., a target or runtime seismic dataset to be interpreted) may be inputted into the data interpretation system 410. Based on receiving the seismic dataset 460, the data interpretation system 410 may identify interpretation options from the trained models matching the seismic dataset. For example, as previously discussed, the data interpretation system 410 may generate and store multiple sets of trained models based on multiple training seismic datasets. As such, the data interpretation system 410 may interpret a target seismic dataset 460 by matching the seismic dataset 460 with a previously generated trained models that are based on previously inputted training seismic dataset. Based on the matching, the data interpretation system 410 may provide interpretation options (e.g., interpretation options 475) that are linked to the trained models. In the example shown in FIG. 4D, the seismic dataset 460 may be matched with the training seismic dataset 450 of FIG. 4C. Accordingly, the data interpretation system 410 may return the interpretation options associated with the previously generated trained models generated in which each interpretation options includes group A and one of subgroups 1, 2, or 3.

As described herein, the trained models may be generated using a supervised machine learning technique and may be used as part of building a machine-based neural network. As such, the trained models need not necessarily contain the entirety of the input training data, and interpretations for the seismic dataset 460 may be predicted based on a subset or portion of the input training data. Alternatively, in some embodiments, an entirety of the input training data may be stored as part of the trained models.

Figure 5:
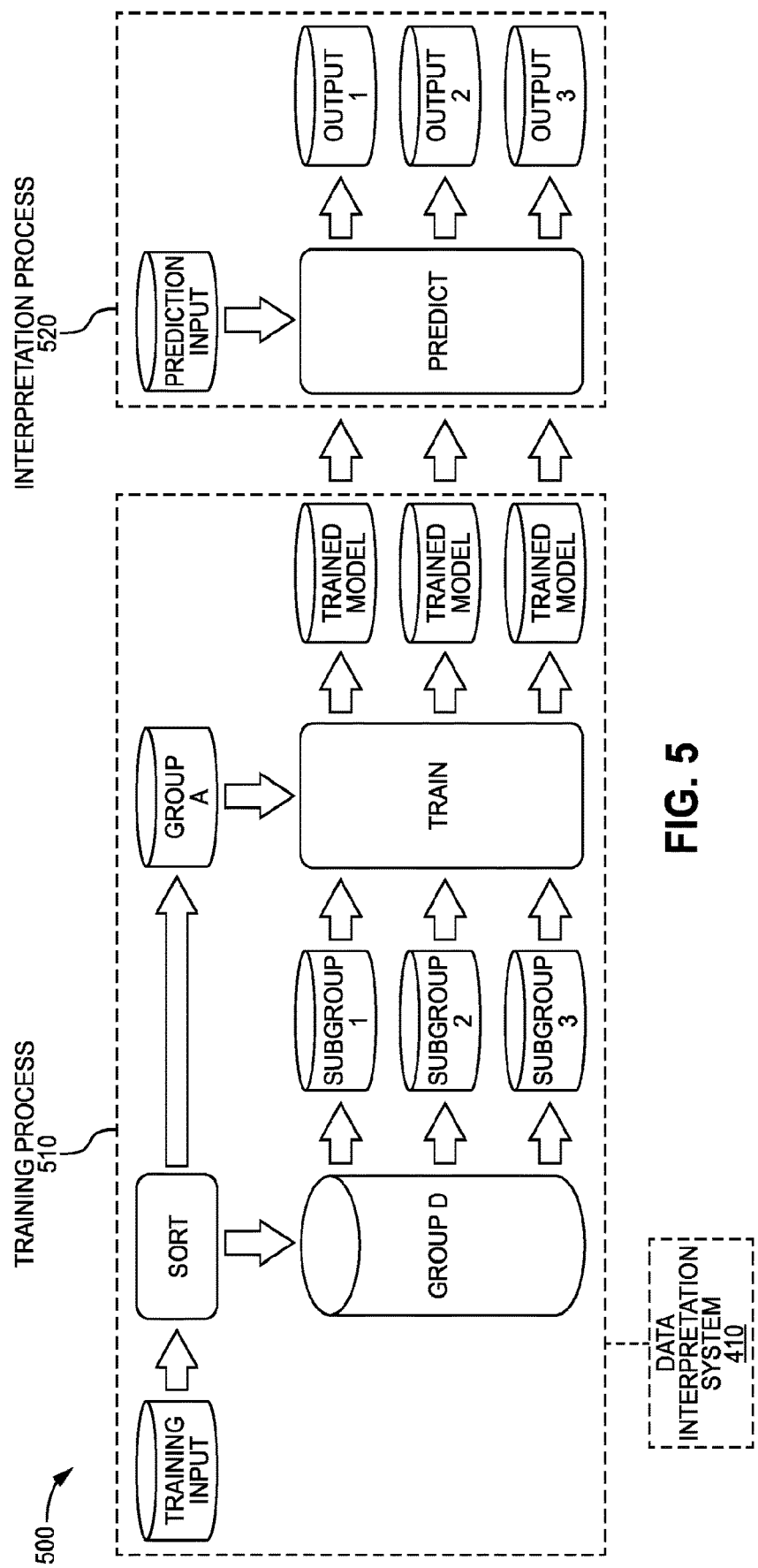
FIG. 5 illustrates an example block diagram for providing multiple different seismic data interpretations according to an embodiment.

FIG. 5 illustrates an example block diagram 500 for providing multiple different seismic data interpretations, according to an embodiment. As shown in FIG. 5, block diagram 500 includes a training process 510, and an interpretation process 520. As described herein, the training process 510 is used to generate multiple different trained models (e.g., in a similar manner as FIG. 4C), and the interpretation process 520 is used to predict or interpret a given input of seismic data (e.g., in a similar manner as FIG. 4D). More specifically, the interpretation process 520 produces multiple computer-generated interpretation options based on the trained models produced by the training process 510. In some implementations, the processes in the block diagram 500 may be performed by one or more computing devices, such as a data interpretation system 410.

As shown in FIG. 5, the training process 510 may include a process step of sorting a training input. As described herein, the training input includes the different interpretations for a given set of training seismic data from multiple different data interpreters. In some embodiments, the sorting function may receive the training input and sorts the training input into two groups (e.g., group A and group D) in which group A includes the portions of the different interpretations that are in agreement, and group D includes the portions of the different interpretations that are in disagreement. As further shown in FIG. 5, group D is sub-divided into multiple subgroups in which individual subgroups including a common attribute. For example, one subgroup may include interpretations made by interpreters having a common attribute (e.g., interpreters who specialize in seismic data interpretations from a particular geographic region, experience level of the interpreter). Another example subgroup may include interpretations made using a particular type of interpretation technique (e.g., a particular fault detection technique). In some implementations, group D may be sub-divided in any variety of other ways not mentioned herein.

In some implementations, a training function may produce a training model based on each subgroup within group D and group A. For example, since group A includes the portion in which the interpretations are in agreement, each trained model is based on group A. In some implementations, the training function may apply machine learning techniques to generate each trained model. For example, a first trained model is generated based on applying machine learning techniques with group A and subgroup one as inputs. A second trained model is generated based on applying machine learning techniques with group A and subgroup two as inputs, and so on and so forth. In this way, the trained models are produced using computer-based machine learning techniques and transforming a subjective process of interpreting data into a machine-based non-subjective process. In some embodiments, the training process 510 may include a supervised machine learning in which the input data (e.g., input seismic data 450) is applied to a learning algorithm.

Once the trained models have been produced, the trained models are used to predict multiple interpretations of a set of seismic data. For example, as part of the interpretation process 520, a prediction input (e.g., a target set of seismic data to interpreted) is processed using a prediction function. In some implementations, the prediction function may apply the training models to the prediction input, and generates multiple outputs (e.g., output 1, output 2, output 3, etc.). Individual outputs are different interpretations of the input seismic data set. In some implementations, the output interpretations may be scored and sorted based on any variety of criteria. As one illustrative example, the output interpretations based on subgroups associated with experts from a particular geographic location may be scored relatively higher. In some implementations, the output interpretations may be displayed and presented so that a data interpreter may view the output interpretations and determine mitigating actions based on a selected output interpretation.

Figure 6A:
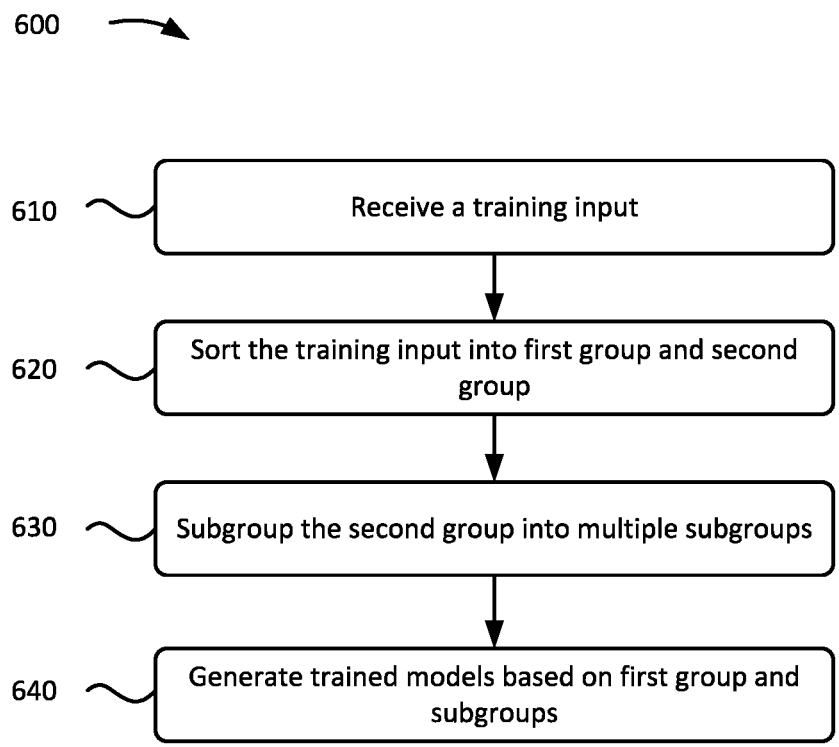
FIGS. 6A and 6B illustrate an example flowchart of a process for generating training models and using the training models to produce multiple computer-generated data interpretation options, according to an embodiment.
Figure 6B:
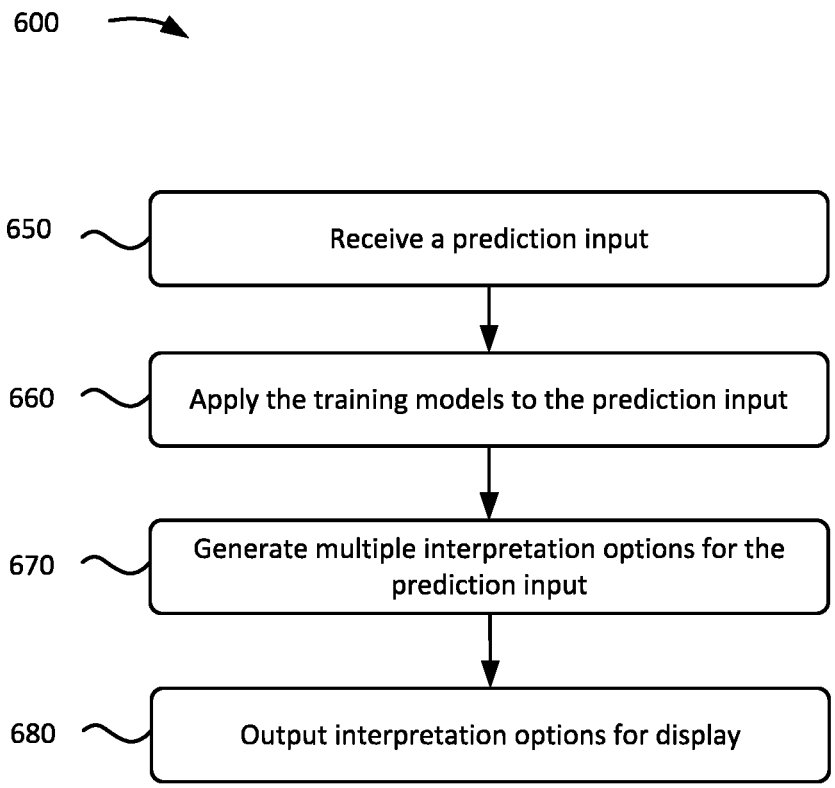

FIGS. 6A and 6B illustrate example flowcharts of a process for generating trained models and using the training models to produce multiple computer-generated data interpretation options. More specifically, FIG. 6A illustrates an example flowchart of a training process for generating trained models (e.g., the training process 510 of FIG. 5). FIG. 6B illustrates an example flowchart of an interpretation process (e.g., the interpretation process 520 of FIG. 5) The blocks of FIGS. 6A and 6B may, for example, correspond to the any of the processes described above with respect to FIGS. 4A-4D, and FIG. 5. The flowcharts illustrate the architecture, functionality, and operation of possible implementations of systems, methods, and computer program products according to various embodiments of the present disclosure. It will be appreciated that the worksteps illustrated in FIGS. 6A and 6B may be conducted in an order other than as illustrated and/or two or more worksteps may be combined into a single step, one workstep may be separated into two worksteps, and/or worksteps may be executed in parallel.

As shown in FIG. 6A, process 600 may include receiving a training input (block 610). For example, the data interpretation system 410 may receive a training input. As described herein, the training input includes multiple different interpretations for a given set of training seismic data (e.g., different interpretations having different attributes, such as interpretation technique, interpreter experience level, interpreters who specialize in seismic data interpretations from a particular geographic region, etc.). In some embodiments, the training input may include any number of predetermined seismic interpretations.

Process 600 may further include sorting the training input into a first group and a second group (block 620). For example, the data interpretation system 410 may sort the training input into two groups (e.g., group A and group D) in which group A includes the portions of the different interpretations that are in agreement, and group D includes the portions of the different interpretations that are in disagreement.

Process 600 may also include subgrouping the second group into multiple subgroups (block 630). For example, the data interpretation system 410 may subgroup the second group (e.g., group D) into multiple subgroups in which each subgroup includes a common attribute (e.g., interpretation technique, interpreter experience level, interpreters who specialize in seismic data interpretations from a particular geographic region, etc.).

Process 600 may further include generating trained models based on the first group and each of the subgroups (block 640). For example, the data interpretation system 410 may produce a training model based on each subgroup within group D (the second group) and group A (the first group). In some embodiments, the data interpretation system 410 may use a supervised machine-based training technique to generate the trained models in which the trained models include group A and one of a subgroup within group D.

In some embodiments, blocks 610-640 may be repeated for multiple sets of training inputs. In this way, trained models are generated for the individual training inputs in which the individual training inputs are used to generate a set of trained models for providing multiple interpretation options.

Referring to FIG. 6B, process 600 may also include receiving a prediction input (block 650). For example, the data interpretation system 410 may receive a prediction input (e.g., a target set of seismic data to interpreted). In some embodiments, the data interpretation system 410 may receive the prediction input from any variety of systems as part of an interpretation process or event in which the interpretation of the prediction input is desired.

Process 600 may further include applying the trained models to the prediction input (block 660). For example, the data interpretation system 410 may apply each of the trained models (e.g., generated using the training process of FIG. 6B) to the prediction input to generate multiple outputs. In some embodiments, applying each of the trained models to the prediction input may involve matching the prediction input to the trained models and identifying which trained models were generated based on data matching the prediction input.

Process 600 may also include generating multiple interpretation outputs for the prediction input (block 670). For example, the data interpretation system 410 may generate multiple interpretation outputs for the prediction input. More specifically, the data interpretation system 410 may identify the training models that were generated based on data matching the prediction input, and generate interpretation options based on the identified training models. As described herein, each interpretation option includes Group A and one of subgroups within Group D.

Process 600 may also include outputting interpretation options for display (block 680). For example, the data interpretation system 410 may output the interpretation options (generated at block 670) for display by a data interpreter. In this way, the data interpreter may view the output interpretations and determine mitigating actions based on a selected output interpretation.

In some embodiments, the interpretation options may be scored, and the score may be presented in connection with their respective interpretation options. The interpretation options may be sorted based on their scores. In some embodiments, the interpretation options may be scored based on any variety of scoring rules, such as rules to score interpretations made by interpreters with greater experience levels higher, or rules to score interpretations interpreted using certain techniques higher. Any other variety of scoring rules may be implemented to score the interpretation options.

Figure 7A:
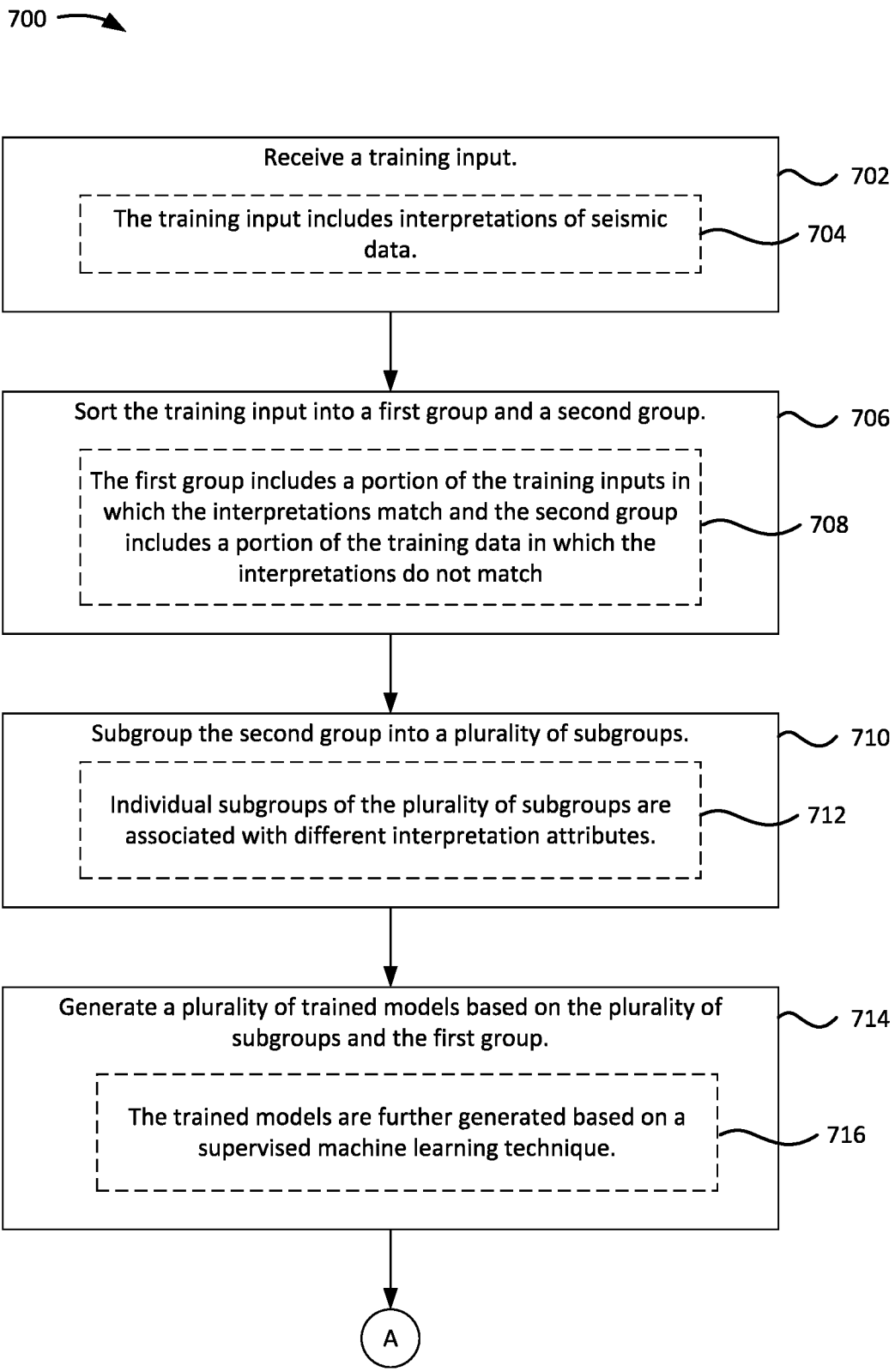
FIGS. 7A and 7B illustrate an example flowchart of a method, according to an embodiment.
Figure 7B:
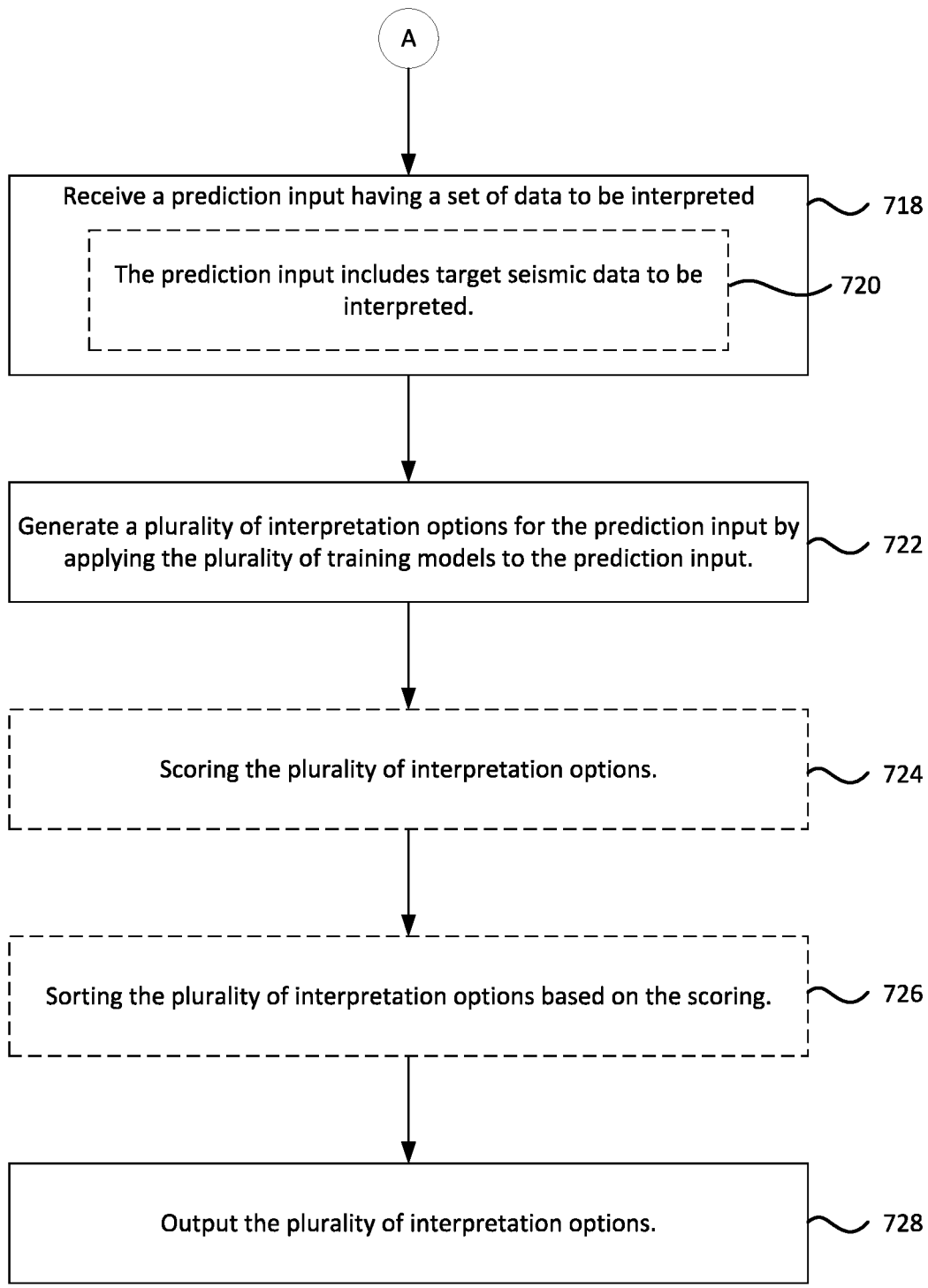

FIGS. 7A and 7B illustrate a flowchart of a method 700, according to an embodiment. It will be appreciated that the worksteps illustrated in FIGS. 7A and 7B may be conducted in an order other than as illustrated and/or two or more worksteps may be combined into a single step, one workstep may be separated into two worksteps, and/or worksteps may be executed in parallel.

The method 700 may include receiving a training input, as at 702 (e.g., FIG. 6A, block 610). In an embodiment, the training input may include (e.g., different) interpretations of seismic data, as at 704 (e.g., as shown at FIG. 4C).

The method 700 may also include sorting the training input into a first group and a second group, as at 706 (e.g., FIG. 6A, block 620). In an embodiment, the first group includes a portion of the training inputs in which the interpretations match and the second group includes a portion of the training data in which the interpretations do not match, as at 708 (e.g., as shown at FIGS. 4B and 4C).

The method 700 may further include subgrouping the second group into a plurality of subgroups, as at 710 (e.g., FIG. 6A, block 630). In an embodiment, individual subgroups of the plurality of subgroups are associated with different interpretation attributes, as at 712 (e.g., FIG. 6A, block 630, one example of individual subgroups of the plurality of subgroups being associated with different interpretation attributes).

The method 700 may also include generating a plurality of trained models based on the plurality of subgroups and the first group, as at 714 (e.g., FIG. 6A, block 640). In an embodiment, the trained models are further generated based on a supervised machine learning technique, as at 716 (e.g., FIG. 4C and FIG. 6A, block 640, one example of trained models further generated based on a supervised machine learning technique).

The method 700 may further include receiving a prediction input having a set of data to be interpreted, as at 718 (e.g., FIG. 6B, block 650). In an embodiment, the prediction input includes target seismic data to be interpreted, as at 720 (e.g., as shown in FIG. 4D, and FIG. 6B, block 650, one example of a prediction input having a set of data to be interpreted).

The method 700 may also include generating a plurality of interpretation options for the prediction input by applying the plurality of training models to the prediction input, as at 722 (e.g., FIG. 6B, block 670). In an embodiment, the plurality of interpretation options may be scored, as at 724 (e.g., FIG. 6B, block 670, one example of the scoring the plurality of interpretation options). In an embodiment, the plurality of interpretation options may be sorted based on the scoring, as at 726 (e.g., FIG. 6B, block 670, one example of the sorting the interpretation options d based on the scoring).

The method 700 may further include outputting the plurality of interpretation options, as at 728 (e.g., FIG. 6B, block 680).

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 8:
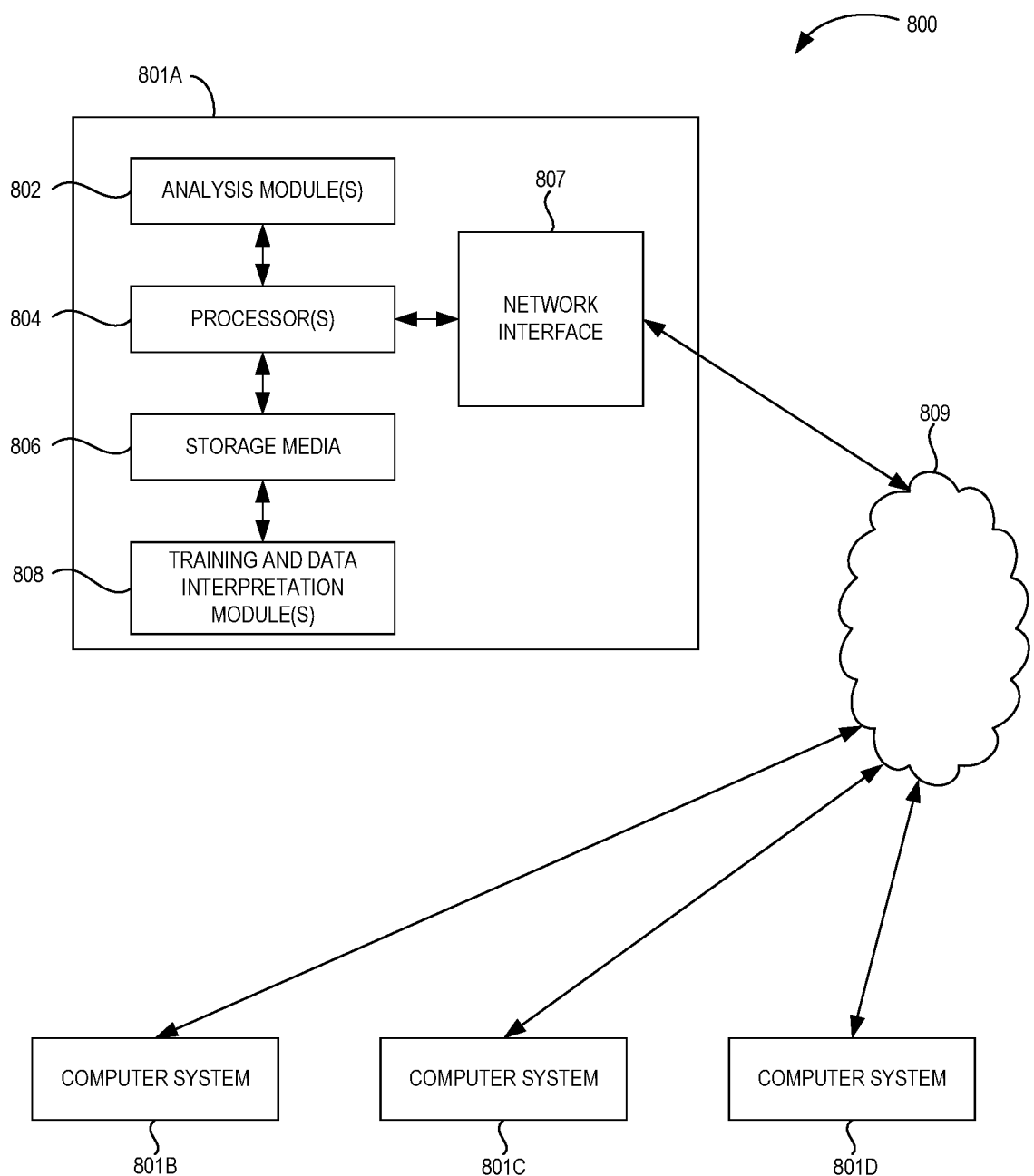
FIG. 8 illustrates a schematic view of a computing system, according to an embodiment.

In some embodiments, any of the methods of the present disclosure may be executed by a computing system, such as the data interpretation system 210. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis module(s) 802 configured to perform various tasks according to some embodiments, such as one or more methods disclosed herein. To perform these various tasks, the analysis module 802 executes independently, or in coordination with, one or more processors 804, which is (or are) connected to one or more storage media 808. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor can include a microprocessor, microcontroller, processor module or subsystem, programmable integrated circuit, programmable gate array, or another control or computing device.

The storage media 808 can be implemented as one or more computer-readable or machine-readable storage media. Note that while in the example embodiment of FIG. 8 storage media 808 is depicted as within computer system 801A, in some embodiments, storage media 808 may be distributed within and/or across multiple internal and/or external enclosures of computing system 801A and/or additional computing systems. Storage media 808 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 800 contains one or more training and data interpretation module(s) 808. In the example of computing system 800, computer system 801A includes the training and data interpretation module 808. In some embodiments, a single training and data interpretation module 808 module may be used to perform some or all aspects of one or more embodiments of the methods. In alternate embodiments, a plurality of training and data interpretation modules 808 may be used to perform some or all aspects of methods.

It should be appreciated that computing system 800 is only one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method, comprising:
    receiving a training input comprising a plurality of interpretations for a set of training seismic data, each of the plurality of interpretations corresponding to a respective data interpreter;
    sorting the training input into: a first group comprising portions of the plurality of interpretations that are in agreement for all of the plurality of interpretations; and
    a second group comprising portions of the plurality of interpretations that are in disagreement for at least two of the plurality of interpretations;
    subgrouping the second group into a plurality of subgroups, each of the plurality of subgroups corresponding to one of the plurality of interpretations;
    generating a plurality of machine-learning trained models, each of the plurality of machine-learning trained models being based on a respective one of the plurality of subgroups and the first group;
    receiving a prediction input having a set of data to be interpreted;
    generating a plurality of interpretation options for the prediction input by applying each of the plurality of machine-learning trained models to the prediction input, each of the plurality of interpretation options corresponding to a respective data interpreter;
    outputting the plurality of interpretation options;
    assigning a respective score to each of the plurality of interpretation options, each respective score being assigned according to at least one scoring rule, the at least one scoring rule including:
    assigning a better score to an interpretation corresponding to a data interpreter having a greater experience level than to an interpretation corresponding to another data interpreter having a lesser experience level;
    assigning a better score to an interpretation corresponding to a data interpreter who uses one or more particular techniques; or
    assigning a better score to an interpretation corresponding to a data interpreter specializing in a particular geographic location corresponding to the prediction input;
    sequentially sorting the plurality of interpretation options based on the assigned scores;
    selecting at least one of the outputted plurality of interpretation options, the selecting being in sequential order according to the sorting and including first selecting a best score among the scores; and
    sending a signal to a controller to cause a drilling tool in a drilling operation to deviate from an original drilling plan based on the selected at least one of the outputted plurality of interpretation options to perform at least one mitigating action comprising controlling at least one of: drilling, weight on a bit, a pump rate, or a physical parameter of the drilling operation,
    wherein the at least one mitigating action improves an operating condition of the drilling operation based on the selected at least one of the outputted plurality of interpretation options or avoids a problem identified by the selected at least one of the outputted plurality of interpretation options.

2. The method of claim 1, wherein the plurality of interpretations includes interpretations of seismic data.

3. The method of claim 2, wherein:
    the first group comprises a portion of the training input in which interpretations of the seismic data match; and
    the second group comprises a portion of the training input in which the interpretations of the seismic data do not match.

4. The method of claim 3, wherein individual subgroups of the plurality of subgroups are associated with interpretation attributes.

5. The method of claim 1, wherein the prediction input includes target seismic data to be interpreted.

6. The method of claim 1, wherein the machine-learning trained models are further generated based on a supervised machine learning technique.

7. A computing system, comprising:
    one or more processors; and
    a memory system comprising one or more non-transitory computer-readable media storing instructions that, when executed by at least one of the one or more processors, cause the computing system to perform operations, the operations comprising:
    receiving a training input comprising a plurality of interpretations for a set of training seismic data, each of the plurality of interpretations corresponding to a respective data interpreter;
    sorting the training input into:
        a first group comprising portions of the plurality of interpretations that are in agreement for all of the plurality of interpretations; and
        a second group comprising portions of the plurality of interpretations that are in disagreement for at least two of the plurality of interpretations;
    subgrouping the second group into a plurality of subgroups, each of the plurality of subgroups corresponding to one of the plurality of interpretations;
    generating a plurality of machine-learning trained models; each of the plurality of machine-learning trained models being based on a respective one of the plurality of subgroups and the first group;
receiving a prediction input having a set of data to be interpreted;
generating a plurality of interpretation options for the prediction input by applying each of the plurality of machine-learning trained models to the prediction input, each of the plurality of interpretation options corresponding to a respective data interpreter;
outputting the plurality of interpretation options;
assigning a respective score to each of the plurality of interpretation options, each respective score being assigned according to at least one scoring rule, the at least one scoring rule including:
    assigning a better score to an interpretation corresponding to a data interpreter having a greater experience level than to an interpretation corresponding to another data interpreter having a lesser experience level;
    assigning a better score to an interpretation corresponding to a data interpreter who uses one or more particular techniques; or
    assigning a better score to an interpretation corresponding to a data interpreter specializing in a particular geographic location corresponding to the prediction input;
sequentially sorting the plurality of interpretation options based on the assigned scores;
selecting at least one of the outputted plurality of interpretation options, the selecting being in sequential order according to the sorting and including first selecting a best score among the scores; and
the one or more processors sending a signal to a controller to cause a drilling tool in a drilling operation to deviate from an original drilling plan based on the selected at least one of the outputted plurality of interpretation options to perform at least one mitigating action comprising controlling at least one of: drilling, weight on a bit, a pump rate, or a physical parameter of the drilling operation,
wherein the at least one mitigating action improves an operating condition of the drilling operation based on the selected at least one of the outputted plurality of interpretation options or avoids a problem identified by the selected at least one of the outputted plurality of interpretation options.

8. The system of claim 7, wherein the plurality of interpretations includes interpretations of seismic data.

9. The system of claim 8, wherein:
the first group comprises a portion of the training input in which interpretations of the seismic data match; and
the second group comprises a portion of the training input in which the interpretations of the seismic data do not match.

10. The system of claim 9, wherein individual subgroups of the plurality of subgroups are associated with interpretation attributes.

11. The system of claim 7, wherein the prediction input includes target seismic data to be interpreted.

12. The system of claim 7, wherein the machine-learning trained models are further generated based on a supervised machine learning technique.

13. A non-transitory computer-readable medium storing instructions that, when executed by one or more processors of a computing system, cause the computing system to perform operations, the operations comprising:
receiving a training input comprising a plurality of interpretations for a set of training seismic data, each of the plurality of interpretations corresponding to a respective data interpreter;
sorting the training input into:
    a first group comprising portions of the plurality of interpretations that are in agreement for all of the plurality of interpretations; and
    a second group comprising portions of the plurality of interpretations that are in disagreement for at least two of the plurality of interpretations;
subgrouping the second group into a plurality of subgroups, each of the plurality of subgroups corresponding to one of the plurality of interpretations;
generating a plurality of machine-learning trained models, each of the plurality of machine-learning trained models being based on a respective one of the plurality of subgroups and the first group;
receiving a prediction input having a set of data to be interpreted;
generating a plurality of interpretation options for the prediction input by applying each of the plurality of machine-learning trained models to the prediction input, each of the plurality of interpretation options corresponding to a respective data interpreter;
outputting the plurality of interpretation options;
assigning a respective score to each of the plurality of interpretation options, each respective score being assigned according to at least one scoring rule, the at least one scoring rule including:
    assigning a better score to an interpretation corresponding to a data interpreter having a greater experience level than to an interpretation corresponding to another data interpreter having a lesser experience level;
    assigning a better score to an interpretation corresponding to a data interpreter who uses one or more particular techniques; or
    assigning a better score to an interpretation corresponding to a data interpreter specializing in a particular geographic location corresponding to the prediction input;
sequentially sorting the plurality of interpretation options based on the assigned scores;
selecting at least one of the outputted plurality of interpretation options, the selecting being in sequential order according to the sorting and including first selecting a best score among the scores; and
the one or more processors sending a signal to a controller to cause a drilling tool in a drilling operation to deviate from an original drilling plan based on the selected at least one of the outputted plurality of interpretation options to perform at least one mitigating action comprising controlling at least one of: drilling, weight on a bit, a pump rate, or a physical parameter of the drilling operation,
wherein the at least one mitigating action improves an operating condition of the drilling operation based on the selected at least one of the outputted plurality of interpretation options or avoids a problem identified by the selected at least one of the outputted plurality of interpretation options.

14. The computer-readable medium of claim 13, wherein the plurality of interpretations includes interpretations of seismic data.

15. The computer-readable medium of claim 13, wherein:
the first group comprises a portion of the training input in which interpretations of the seismic data match; and
the second group comprises a portion of the training input in which the interpretations of the seismic data do not match.

16. The computer-readable medium of claim 13, wherein individual subgroups of the plurality of subgroups are associated with interpretation attributes.

17. The computer-readable medium of claim 13, wherein the prediction input includes target seismic data to be interpreted.

18. The computer-readable medium of claim 13, wherein the machine-learning trained models are further generated based on a supervised machine learning technique.

* * * * *